(No Model.)
W. D. SCHUYLER.
TRAP AND OVERFLOW STOP FOR WASH BASINS, &c.
No. 266,208. Patented Oct. 17, 1882.
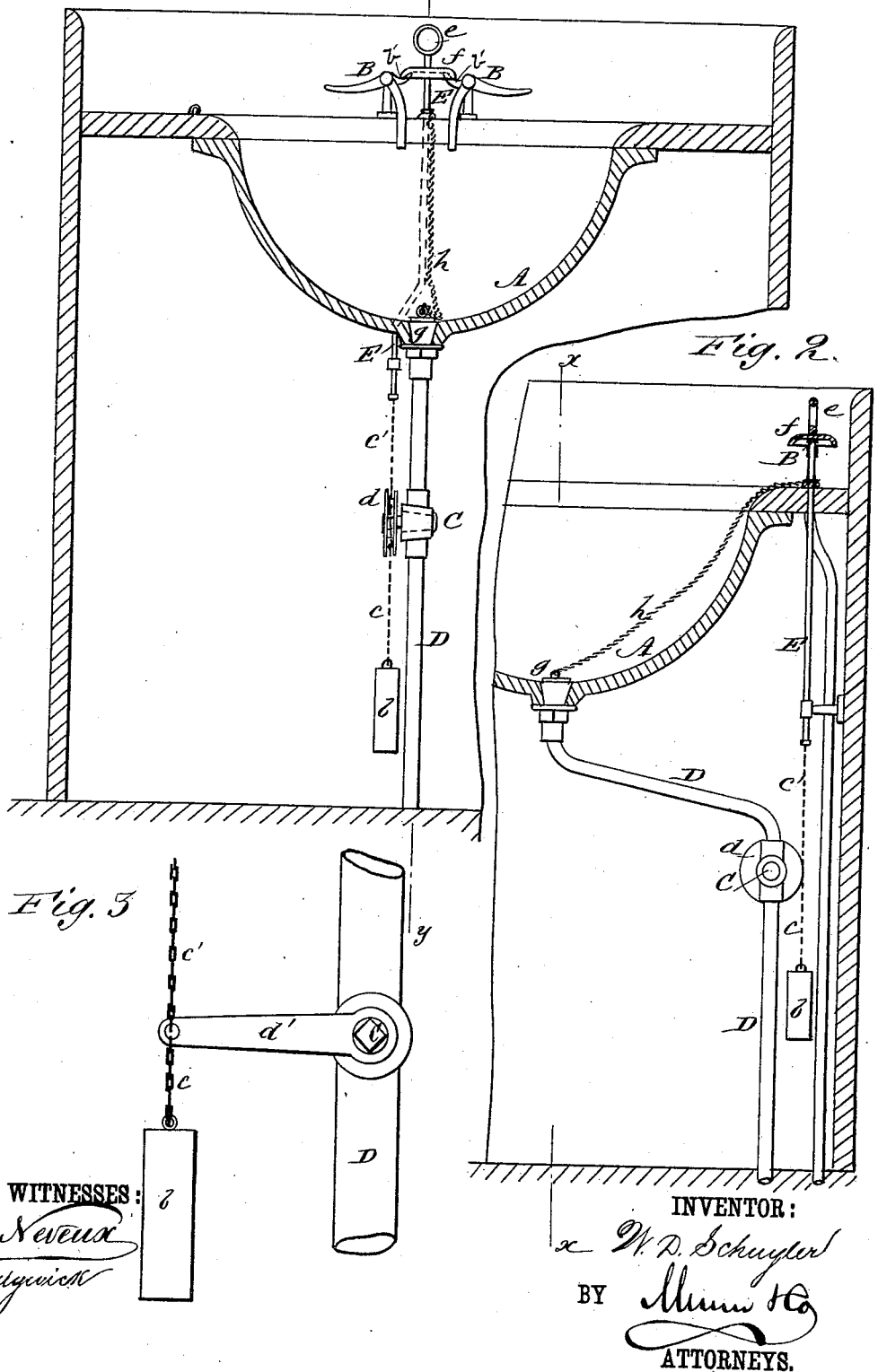
WITNESSES:
C. Neveux
T. Sedgwick
INVENTOR:
W. D. Schuyler
BY Munn & Co
ATTORNEYS.

UNITED STATES PATENT OFFICE.

WILLIAM D. SCHUYLER, OF NEW YORK, N. Y.

TRAP AND OVERFLOW-STOP FOR WASH-BASINS, &C.

SPECIFICATION forming part of Letters Patent No. 266,208, dated October 17, 1882.

Application filed March 1, 1882. (No model.)

*To all whom it may concern:*

Be it known that I, WILLIAM D. SCHUYLER, of the city, county, and State of New York, have invented a new and Improved Trap and Overflow-Stop for Wash-Basins, Water-Closets, &c., of which the following is a full, clear, and exact description.

Reference is to be had to the accompanying drawings, forming part of this specification, in which similar letters of reference indicate corresponding parts in all the figures.

Figure 1 represents a vertical section of a stationary wash basin and stand with my invention applied, said section being taken on the line $x$ $x$ in Fig. 2. Fig. 2 is a further vertical section of the same, in part, in a plane at right angles to Fig. 1, on the line $y$ $y$. Fig. 3 is a view upon a larger scale of a modification of one of the details.

This invention, which is applicable to stationary wash-basins, bath-tubs, and other like structures, relates to apparatus or devices in which the faucet that lets on the water in the basin or receptacle has combined with it a valve in or connected with a waste-pipe, and which opens and closes with the opening and closing of the faucet for the purpose of preventing the escape of the sewer-gas up the waste-pipe.

The invention consists in special combinations of devices, whereby great working convenience is obtained for insuring the opening of the trap or waste-pipe valve with that of the faucet or faucets, and for automatically closing said valves when not purposely restrained, and whereby not only an adequate opening of the waste-pipe valve is insured, but also whereby, through a suitable loose connection, the waste-pipe valve may be opened independently of the faucet or faucets, and is made to automatically close and shut off the back-flow of gas from the waste-pipe whenever said loose connection is released.

In the drawings, which represent the invention as applied to a stationary wash stand or basin, A indicates the basin; B B, hot and cold water supply faucets or valves, which may be of the usual or any suitable self-closing construction. C is the valve in the waste-pipe. This valve, which is here shown as a simple cock, but may be a diaphragm or any other kind of valve, is represented as being made automatically closing by means of a weight, $b$, connected by a chain, $c$, with a pulley, $d$, on the cock, as in Figs. 1 and 2, or lever $d'$, as in Fig. 3; or a spring may be substituted for the weight $b$. Connected with the pulley $d$ or lever $d'$ by chain $c'$ or otherwise is a rod or opening device, E, for the valve C. This rod, which may have an eye or handle, $e$, for lifting it by hand, rests, when down, by a stop, $f$, on the faucet or faucets B, so that when opening either faucet the stop $f$ and rod E will be raised, thus insuring the opening of the cock C at the same time, which prevents overflow in the basin, and as, when the faucets close, the valve C is also necessarily closed, no sewer or other gas can escape up the waste-pipe. Whenever it is required to open the valve C independently of the faucet or faucets B the rod E is lifted by hand, thus providing for the discharge of water standing in the basin.

To retain water in the basin for washing or other purposes, a hand-stopple, $g$, of usual construction may be applied to the discharge-opening in the basin, and this stopple, if desired, be connected by a loose chain or connection, $h$, with the rod E, so that when fully opening the valve C by directly pulling on the rod E to discharge water from the basin the stopple $g$ will also be raised or opened, but will not be opened when the rod E is only partially raised by the opening of the faucet or faucets. Such stopple-connection, however, is not an absolute necessity, and may be changed, if desired.

The faucets B B here represented, it will be noticed, are operated by levers which are pressed down to open them, and these levers are provided with extensions $b'$ on the opposite sides of their axes, by which the chain $c'$ or loose connections E $c'$ between the faucets and the valve C are raised to open the valve C when either faucet is opened. This insures an adequate opening of the waste-pipe valve; also, the loose connections between the faucets and the waste-pipe valve admit, by pulling upward on said loose connections, of the opening of the waste-pipe valve when necessary, independent of and without any operation of the faucets, and allow the waste-pipe valve to close itself without interference by the loose connections. Furthermore, from the foregoing description it will be seen that when either or both of the faucets are open the trap or waste-pipe valve C is open also, and that while the faucets are separately automatically closing, and by their chains or loose connections with the waste-pipe valve separately close to admit of the independent opening of either one only, they are not wholly dependent upon their separate automatically-closing springs or weights, but are automatically closed, except when purposely restrained by the spring or weight which closes the waste-pipe valve C, so that in case of a faucet failing to close itself through breakage of or defect in its spring the automatically-closing waste-pipe valve will shut it. By the combination, too, with the basin, top, or other suitable support and with the waste-pipe valve, of the loose connection E c', said waste-pipe valve automatically closes and shuts off the back-flow of gas from the waste-pipe whenever said loose connection E c' is released.

Having thus fully described my invention, I claim as new and desire to secure by Letters Patent—

1. A vertical rod movable downwardly by a weight and having a stop, f, in combination with faucets B, having each an extension, b, whereby the faucets will be closed automatically, as described.

2. The waste-pipe valve C, carrying a pulley, d, in combination with the weighted cord e, attached to a rod raised by the opening of the supply valves or faucets, whereby the supply and waste pipe valves will open and close simultaneously, as described.

3. The operating-levers of either faucet B, constructed with an extension, b', combined and arranged for operation with the self-closing waste-pipe valve C through a loose connection, E c', and stop f, substantially as described, whereby an adequate opening of the waste-pipe valve is insured, as set forth.

W. D. SCHUYLER.

Witnesses:
 A. GREGORY,
 C. SEDGWICK.